United States Patent [19]

Monden

[11] Patent Number: 6,094,507
[45] Date of Patent: Jul. 25, 2000

[54] FIGURE LOCATION DETECTING SYSTEM

[75] Inventor: Akira Monden, Tokyo, Japan

[73] Assignee: NEC Corporation, Tokyo, Japan

[21] Appl. No.: 09/039,940

[22] Filed: Mar. 17, 1998

[30]     Foreign Application Priority Data

Mar. 17, 1997   [JP]   Japan .................................. 9-083351

[51] Int. Cl.⁷ .............................. G06K 9/00; G06K 9/46; G06K 9/50; G06K 9/62; G06K 9/66

[52] U.S. Cl. .......................... 382/195; 382/124; 382/190; 382/201; 382/209

[58] Field of Search ..................................... 382/124, 125, 382/190, 195, 201, 209, 219, 220

[56]            References Cited

U.S. PATENT DOCUMENTS

| | | | |
|---|---|---|---|
| 4,135,147 | 1/1979 | Riganati et al. ......................... | 382/125 |
| 4,646,352 | 2/1987 | Asai et al. ............................... | 382/125 |
| 4,896,363 | 1/1990 | Taylor et al. ............................ | 382/201 |
| 5,321,765 | 6/1994 | Costello .................................. | 382/125 |
| 5,631,972 | 5/1997 | Ferris et al. ............................. | 382/125 |
| 5,960,101 | 9/1999 | Lo et al. ................................. | 382/125 |

FOREIGN PATENT DOCUMENTS

| | | |
|---|---|---|
| 59-2185 | 1/1984 | Japan . |
| 59-793 | 1/1984 | Japan . |
| 62-127989 | 6/1987 | Japan . |
| 63-21232 | 5/1988 | Japan . |
| 4-195262 | 7/1992 | Japan . |
| 4-313167 | 11/1992 | Japan . |
| 5-181949 | 7/1993 | Japan . |
| 6-68241 | 3/1994 | Japan . |

OTHER PUBLICATIONS

Ko Asai et al., "Automated Fingerprint Identification by Minutia–Network Feature—Matching Process", *Inst. of Elect., Info and Comm. Eng. of Japan*, vol. J72–D–II, No. 5, May 1989, pp. 733–740.

Akira Monden et al., "Correct Position Search for Palmprint Using Neighbor Minutiae", *Technical Report of IEICE*, PRMU97–40, 1997, pp. 23–30.

*Primary Examiner*—Phuoc Tran
*Assistant Examiner*—Daniel G. Mariam
*Attorney, Agent, or Firm*—Sughrue, Mion, Zinn, Macpeak & Seas, PLLC

[57]            ABSTRACT

A figure location detecting system is designed to detect a location of a first figure (e.g., search fingerprint) within a second figure (e.g., file fingerprint). Particularly, the system is designed to correctly match characteristic points of the first figure with characteristic points of the second figure even if the first figure contains a plenty of similar characteristic points whose characteristics are similar with each other and/or even if the first figure is (partially) distorted. Herein, the system creates matching characteristic point pair candidates each corresponding to a pair of a first characteristic point, corresponding to one of the characteristic points of the first figure, and a second characteristic point corresponding to one of the characteristic points of the second figure. The matching characteristic point pair candidates are created on the basis of relative characteristics which are calculated for proximity characteristic points which exist in proximity to the first and second characteristic points respectively. Then, the system narrows down the matching characteristic point pair candidates to matching characteristic point pairs by removing wrong matching characteristic point pair candidates, each of which is detected as a wrong match in consideration of a matching situation of the proximity characteristic points. Coordinate matching parameters are produced with respect to each of the matching characteristic point pairs. Thus, the system outputs most concentrated coordinate matching parameters which values of the coordinate matching parameters sequentially produced concentrate in most frequently.

21 Claims, 6 Drawing Sheets

FIGURE LOCATION DETECTING SYSTEM

BACKGROUND OF THE INVENTION

1. Field of the Invention

This invention relates to figure location detecting systems which detect positional relationships between figures to be matched with each other. This application is based on patent application No. Hei 9-83351 filed in Japan, the content of which is incorporated herein by reference.

2. Prior Art

Conventionally, there is provided technology to detect a positional relationship between figures, in other words, technology to perform detection as to which location (or part) of a second figure a first figure matches with. This technology is used for the figure matching devices which perform the matching process with respect to fingerprints and aerial photographs.

For example, the paper of Japanese Patent Laid-Open Publication No. 5-181949 (denoted by "paper 1") discloses an image positioning device corresponding to one example of the above technology conventionally known. According to this, an airplane equipped with a photographing machine flies over some terrestrial areas to take geomorphologic pictures, from which a matched picture being subjected to the matching process with another picture is obtained. Then, the device detects a positional correspondence between positional coordinates of the matched picture and the map coordinates which are determined in advance.

In the conventional system, characteristic points are extracted from the matched picture and are subjected to affine transformation using an affine coefficient which is set in advance. Thus, the matched picture is transformed to conform with the map coordinate system. The point pattern matching is performed between "matching" characteristic points, which are used as reference for the matching process (or pattern matching), and matched characteristic points which are obtained by the affine transformation of the characteristic points to conform with the map coordinate system. Thus, it is possible to provide matching characteristic point pair candidates through the point pattern matching. Thereafter, the system performs processes similar to the aforementioned processes with respect to each of matching cases while changing the affine coefficient by a prescribed interval of value. Those processes are repeated until the affine coefficient, which is changed every time the processes are performed with respect to each of the matching cases, becomes out of a prescribed range. When execution of the processes is ended because the affine coefficient becomes out of the prescribed range, the conventional system selects a matching case that a number of the matching characteristic point pair candidates is the largest from among the aforementioned matching cases. Coordinates values of the matching characteristic point pair candidates in the selected matching case are placed into a transformation equation representing a coordinate relationship between two figures. Thus, the system produces a coefficient of the above transformation equation.

According to the conventional technology described above, the matched picture corresponds to an aerial photograph taken by the photographing machine whose dip and photographing direction are roughly determined in advance. In other words, the conventional technology is not designed in consideration of the situation where the direction of the matched picture is uncertain. So, the conventional technology is inapplicable to the situation where the direction of the matched picture is uncertain. In addition, the conventional technology handles the whole area of the matched picture by using single affine transformation. So, the conventional technology is inapplicable to the situation where the matched picture is partially distorted. Further, the conventional technology is designed such that the coordinate values of the matching characteristic point pair candidates are placed into the transformation equation to produce the coefficient of the transformation equation. So, if an error is included in the matching characteristic point pair candidates which are used to produce the coefficient of the transformation equation, there is a high risk that the produced coefficient of the transformation equation becomes incorrect.

Meanwhile, the fingerprint matching technology introduces a concept in definition of the center of the fingerprint pattern. The conventional technology uses such a concept to match characteristic points of a search fingerprint with characteristic points of a file fingerprint with respect to the coordinates system. One example of this technology is disclosed by the paper (denoted by "paper 2") of the monographic journal of the Institute of Electronics, Information and Communication Engineers of Japan, Volume J72-DII, No. 5, pp. 733–740 issued on May of 1989, for example. However, this technology is inapplicable to the picture, such as the palm print, which does not contain a pattern which can be defined as the center.

The paper of Japanese Patent Publication No. 63-21232 (denoted by "paper 3") discloses another example of the above technology.

According to the above, the system finds out the characteristic point of the search fingerprint and the characteristic point of the file fingerprint, which are similar each other with respect to an amount of local characteristics. Those characteristic points are connected with each other as a matching characteristic point pair candidate. Then, the system calculates a similarity score for the above matching characteristic point pair candidate. Incidentally, an amount of local characteristics is defined by the kind(s) of the characteristic points or a number of characteristic points which exist within a certain radius range of the figure. Suppose a local coordinate system that the characteristic point is used as an origin of the coordinates while the direction of the characteristic point is represented by a Y axis. Herein, an amount of local characteristics is defined by a number of other characteristic points which are distributed in each of quadrants of the local coordinate system or a number of ridge lines which intervene between the characteristic point in each quadrant of the local coordinate system and its closest characteristic point.

Thereafter, the system rotates the search fingerprint by a certain angle of rotation. Then, the following processes are performed with respect to each characteristic point of the rotated search fingerprint, as follows:

The system selects one of the characteristic points of the rotated search fingerprint. The file fingerprint has characteristic points, one of which is connected with the above characteristic point selected by the system. So, the system calculates differences between X, Y coordinates values of the selected characteristic point and X, Y coordinates values of the connected characteristic point of the file fingerprint. Being connected with the differences, the system records a similarity score calculated for a pair of the above characteristic points on a recording media. Thereafter, the system selects another characteristic point from among the characteristic points of the search fingerprint which are not selected. So, the system performs processes similar to the foregoing processes on the newly selected characteristic point. In this case, the system calculates differences with regard to the newly selected characteristic point. If the differences newly calculated exist in the pre-calculated differences which have been already calculated, a similarity score calculated for a pair of characteristic points is accumulated with the similarity score which has been already recorded with being connected with the pre-calculated differences. The above processes are repeatedly performed with respect to all of the characteristic points of the search fingerprint. Thereafter, the system selects a highest similarity score (i.e., maximum weighting factor) from among the similarity scores which are recorded. In addition, the system calculates differences which are connected to the highest similarity scores. So, the system records the maximum weighting factor and differences on a recording media.

Next, the system rotates the search fingerprint again. So, the system performs processes similar to the foregoing processes with respect to the rotated search fingerprint. Thus, the system calculates a maximum weighting factor as well as differences which are connected to the maximum weighting factor with respect to the rotated search fingerprint. Then, the system compares the "present" maximum weighting factor which is presently calculated with the "previous" maximum weighting factor which has been previously calculated but which remains now. Only when the present maximum weighting factor is greater than the previous maximum weighting factor, the system renews recorded values with values corresponding to the differences and maximum weighting factor which are presently calculated.

By repeating the foregoing processes, it is possible to obtain a rotation angle of the search fingerprint which makes the maximum weighting factor to be really maximal as well as differences regarding X, Y coordinates values. The above rotation angle is used as a best rotation angle that establishes a best matching state between the characteristic points of the search fingerprint and the characteristic points of the file fingerprint. In addition, the differences which are calculated with respect to the above rotation angle are used as an amount of parallel displacement (or parallel translation).

In short, the conventional technology described above performs calculations and matching processes while rotating the search fingerprint, which is a searched picture subjected to search, by a certain angle, so it produces differences regarding X, Y coordinates values with respect to a certain rotation angle of the search fingerprint that makes the maximum weighting factor to be really maximal. The above rotation angle and differences are used as the best rotation angle and parallel displacement respectively, which establish a best matching state between the characteristic points of the search fingerprint and the characteristic points of the file fingerprint. Thus, this technology is applicable to the picture whose direction is uncertain and the picture which does not have a pattern defining the center. In addition, this technology is applicable to the situation where a wrong matching characteristic point pair candidate is included in the matching characteristic point pair candidates.

The aforementioned paper 3 does not at all provide a concrete description as to the method (or technique) how to obtain the matching characteristic point pair candidates between the characteristic points of the searched picture and the characteristic points of the file picture. According to the technology described in the paper 3, even if the system selects wrong matching characteristic point pair candidates which are wrongly proposed to some extent, the system is capable of producing "correct" coordinate matching parameters (i.e., rotation angle and parallel displacement).

However, if the system selects a number of wrong matching characteristic point pair candidates, there is a high risk that the system produces "incorrect" coordinate matching parameters. In general, when there exist a plenty of characteristic points whose characteristics are similar each other within the searched picture, a risk that the system selects a plenty of wrong matching characteristic point pair candidates becomes higher. So, the foregoing conventional technology must suffer from an increased risk that incorrect coordinate matching parameters are produced when a plenty of characteristic points whose characteristics are similar each other exist within the searched picture. In addition, the above technology is not designed in consideration of the situation where the searched picture contains distortion. So, when using the distorted picture (or partially distorted picture) as the searched picture, the conventional technology suffers from a problem that incorrect coordinate matching parameters are produced.

SUMMARY OF THE INVENTION

It is an object of the invention to provide a figure location detecting system which detects a positional relationship between figures so as to correctly produce coordinate matching parameters, representing the matching between coordinates of figures, even if a searched figure is partially distorted or even if a searched figure contains a plenty of similar characteristic points whose characteristics are similar each other.

A figure location detecting system of this invention is designed to detect a location of a first figure (e.g., search fingerprint) within a second figure (e.g., file fingerprint). Particularly, this invention is designed to correctly match characteristic points of the first figure with characteristic points of the second figure even if the first figure contains a plenty of similar characteristic points whose characteristics are similar with each other and/or even if the first figure is (partially) distorted.

At first, the figure location detecting system creates matching characteristic point pair candidates each corresponding to a pair of a first characteristic point, corresponding to one of the characteristic points of the first figure, and a second characteristic point corresponding to one of the characteristic points of the second figure. The matching characteristic point pair candidates are created on the basis of relative characteristics which are calculated for proximity characteristic points which exist in proximity to the first and second characteristic points respectively. Then, the system narrows down the matching characteristic point pair candidates to matching characteristic point pairs by removing wrong matching characteristic point pair candidates, each of which is detected as a wrong match in consideration of a matching situation of the proximity characteristic points. Coordinate matching parameters are produced with respect to each of the matching characteristic point pairs. The coordinate matching parameters contain coordinate values and a direction of the characteristic point on a coordinate system, an origin of which is determined based on coordinate values of the characteristic point and an axis of which is determined based on an amount of characteristics of the characteristic point.

Thus, the system outputs most concentrated coordinate matching parameters which values of the coordinate matching parameters sequentially produced concentrate in most frequently.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Now, a description will be given with respect to the preferred embodiment of the invention in conjunction with drawings.

Figure 1:
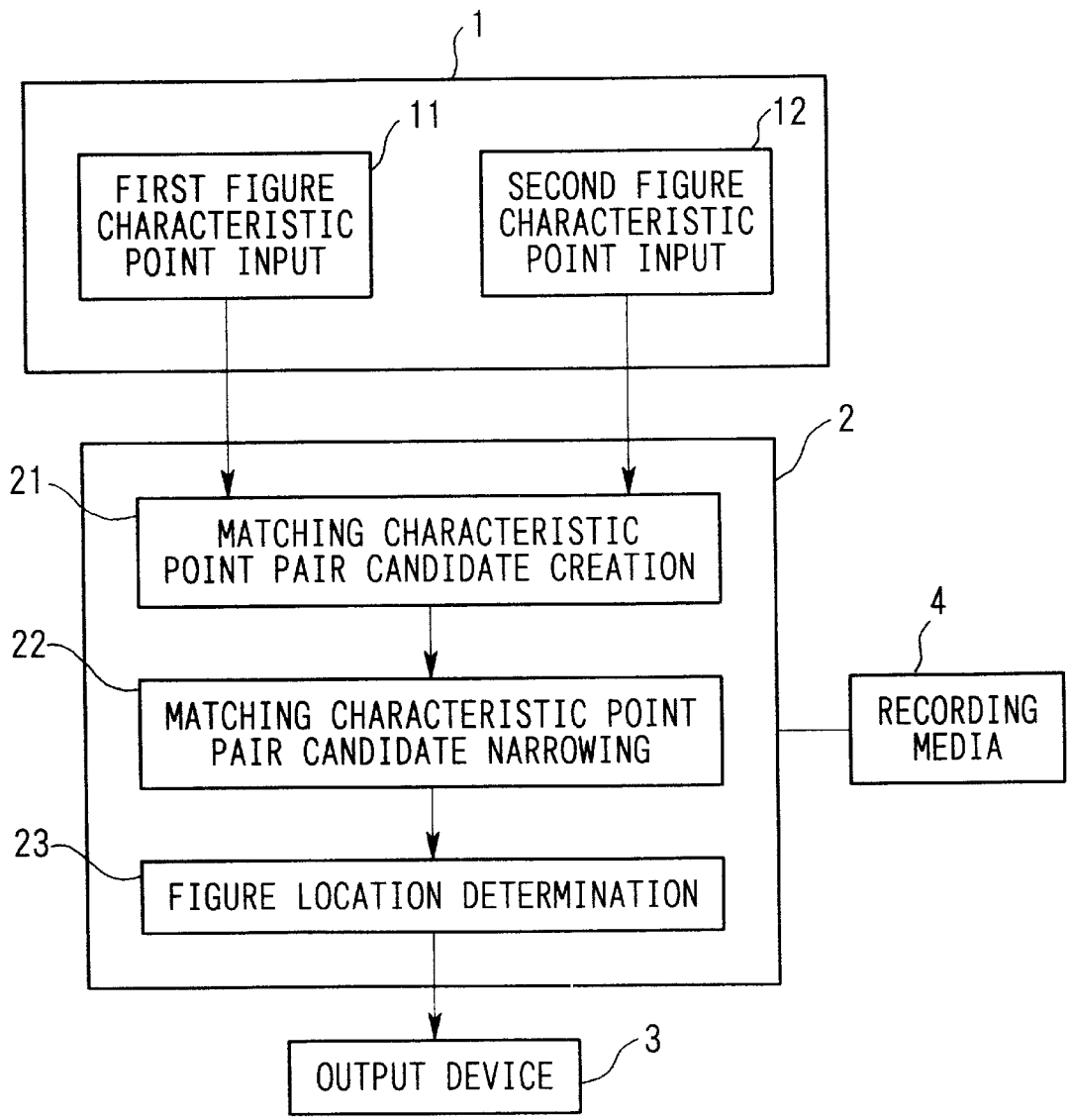
FIG. 1 is a block diagram showing an example of a configuration of a figure location detecting system in accordance with the embodiment of the invention.

FIG. 1 shows a configuration of a figure location detecting system in accordance with the preferred embodiment of the invention. This system is configured mainly by an input device 1, a data processing device 2, an output device 3 and a recording media 4. Herein, the input device 1 is configured using a keyboard and a storage unit such as a hard-disk unit, a floppy-disk unit and a compact dick unit; the data processing device 2 is configured by a computer which operates under the control of programs; and the output device 3 is configured using a display unit and a printer as well as a storage unit such as a hard-disk unit and a floppy-disk unit.

The input device 1 has functions which are represented by two blocks, i.e., a first figure characteristic point input block 11 and a second figure characteristic point input block 12.

The first figure characteristic point input block 11 produces an amount of characteristics with respect to each of characteristic points which exist in a first figure corresponding to a searched figure to be subjected to search, so the amount of characteristics is input to the data processing device 2. The second figure characteristic point input block 12 produces an amount of characteristics with respect to each of characteristic points which exist in a second figure, so the amount of characteristics is input to the data processing device 2.

The data processing device 2 contains a matching characteristic point pair candidate creation block 21, a matching characteristic point pair candidate narrowing block 22 and a figure location determination block 23.

The matching characteristic point pair candidate creation block 21 refers to characteristic points of the second figure so as to extract a characteristic point, which has a possibility of being assumed as equivalence of a characteristic point of the first figure and which is connected with a characteristic point of the first figure. Thus, the block 21 provides a pair of the characteristic points connected with each other as a matching characteristic point pair candidate. Herein, a decision as to whether the characteristic points can be connected with each other is made based on amounts of relative characteristics each calculated for each of proximity characteristic points which exist in proximity to the characteristic point within a prescribed range of distance. Incidentally, the amount of relative characteristics depends of a relationship between the characteristic point and its proximity characteristic point.

The matching characteristic point pair candidate narrowing block 22 removes a wrong matching characteristic point pair candidate, which is considered to be wrongly matched with the characteristic point. A decision to choose the wrong matching characteristic point pair candidates is made based on the matching situation with respect to the proximity characteristic points. Thus, the block 22 removes characteristic points, each of which is considered as a wrong match on the basis of the matching situation of the proximity characteristic points, from pairs of characteristic points which are proposed as the matching characteristic point pair candidates by the matching characteristic point pair candidate creation block 21. Thus, the block 22 outputs remaining pairs of characteristic points as matching characteristic point pairs.

Using the matching characteristic point pairs which are narrowed down by the matching characteristic point pair candidate narrowing block 22, the figure location determination block 23 produces coordinate matching parameters to match the first figure with the second figure.

The data processing device 2 is equipped with the recording media 4 which records a figure location detecting program. As the recording media 4, it is possible to employ a magnetic disk, semiconductor memory and other recording media. The data processing device 2 loads the figure location detecting program recorded on the recording media 4. By controlling the operation of the data processing device 2 based on the figure location detecting program, it is possible to realize functions of the matching characteristic point pair candidate creation block 21, the matching characteristic point pair candidate narrowing block 22 and the figure location determination block 23 on the processing of the data processing device 2.

Next, a description will be given with respect to operations of the data processing device 2 in conjunction with FIG. 2 and FIG. 3. Herein, FIG. 2 shows a flow of steps with respect to an example of overall processing of the data processing device 2, while FIG. 3 shows a flow of steps with respect to an example of processing regarding creation of matching characteristic point pair candidates by the matching characteristic point pair candidate creation block 21.

Figure 2:
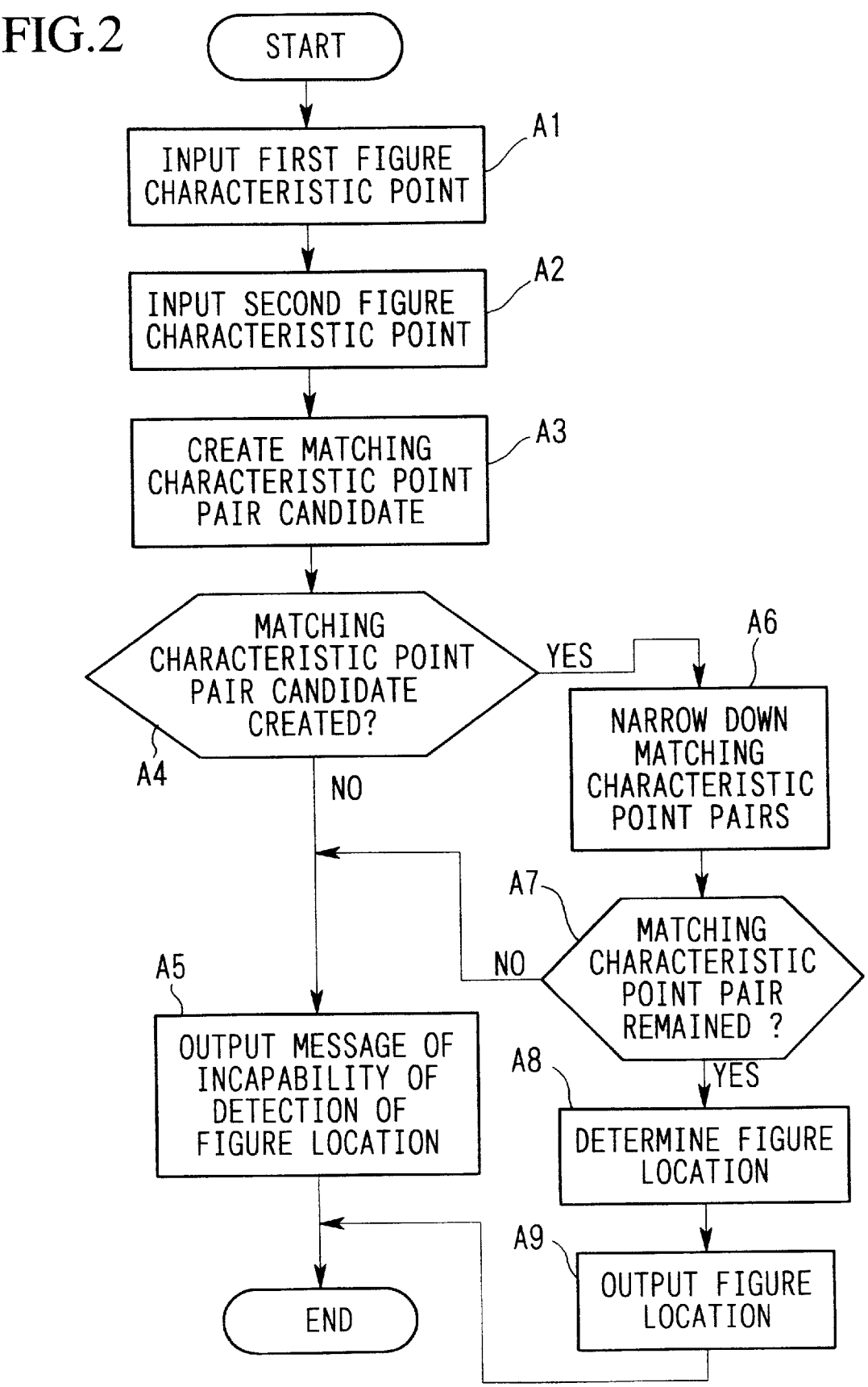
FIG. 2 is a flowchart showing processes of the figure location detecting system of FIG. 1.

In step A1 shown in FIG. 2, the first figure characteristic point input block 11 inputs amounts of characteristics of characteristic points of the first figure into the data processing device 2. In step A2, the second figure characteristic point input block 12 inputs amounts of characteristics of characteristic points of the second figure into the data processing device 2.

Then, the matching characteristic point pair candidate creation block 21 of the data processing device 2 makes a decision as to which of the characteristic points of the second figure each of the characteristic points of the first figure matches with. Using results of the decision, the block 21 creates a matching characteristic point pair candidate list P in step A3.

Figure 3:
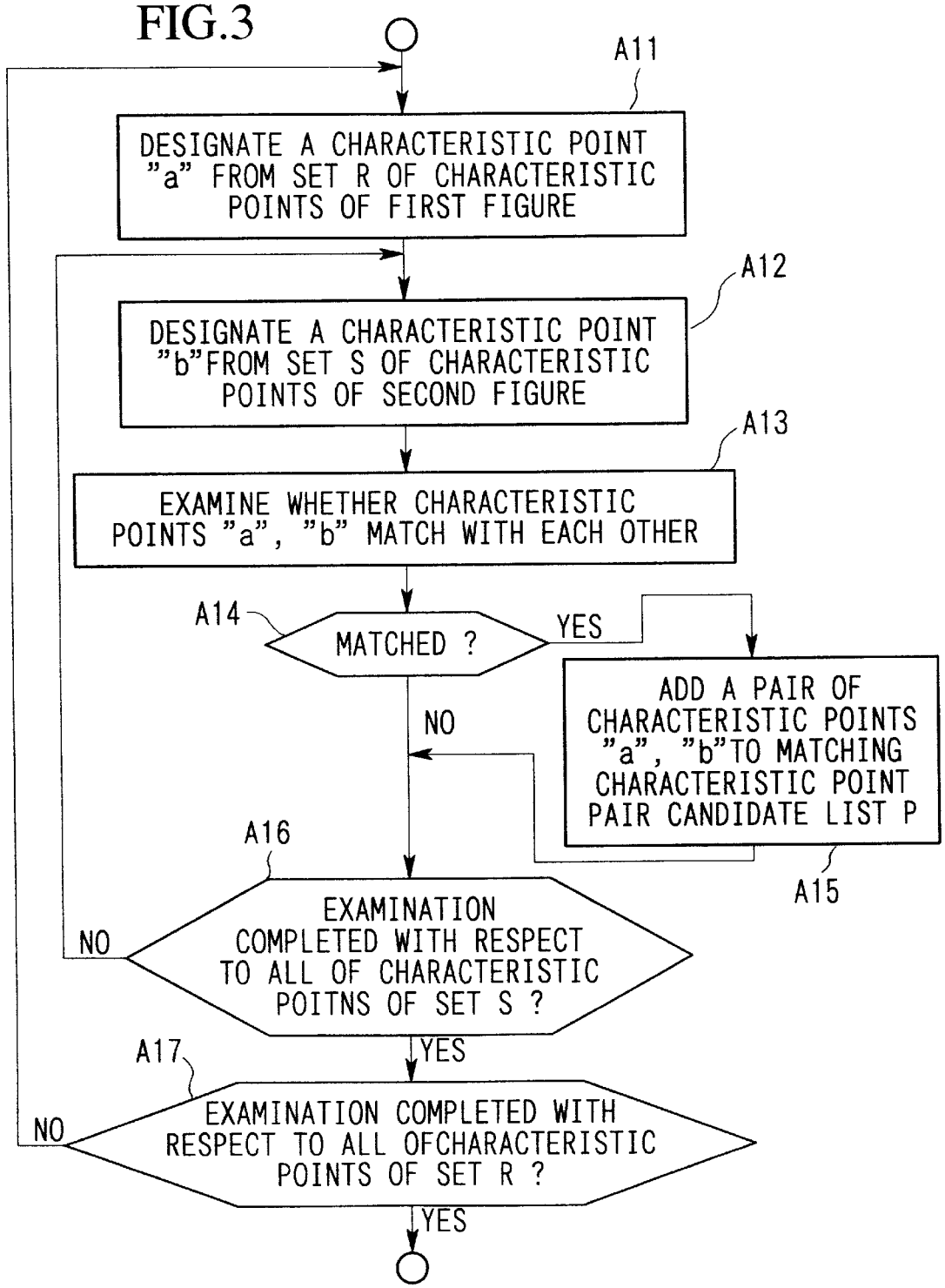
FIG. 3 is a flowchart showing processes for creation of matching characteristic point pair candidates.

Details of the step A3 are shown in FIG. 3. In step A11, the block 21 designates a single characteristic point from a set R of the characteristic points of the first figure, so the designated characteristic point is denoted by a symbol "a". In step A12, the block 21 designates a single characteristic point from a set S of the characteristic points of the second figure, so the designated characteristic point is denoted by a symbol"b". In step A13, an examination is performed as to a possibility that the characteristic point "a" is identical to the characteristic point "b" or a possibility that the characteristic point "a" is connected with the characteristic point "b". A decision as to whether the possibility that the characteristic point "a" is identical to the characteristic point "b" is made based on amounts of relatively characteristics calculated for proximity characteristic points, which exist in proximity to the characteristic point "a", and amounts of relative characteristics of proximity characteristic points which exist in proximity to the characteristic point "b". Herein, an amount of relatively characteristics depends on a relationship between the characteristic point and its proximity characteristic point. That is, an amount of relative characteristics which is calculated with respect to each of proximity characteristic points which exist in proximity to the characteristic point "a" is compared with an amount of relative characteristics which is calculated with respect to each of proximity characteristic points which exist in proximity to the characteristic point "b". Herein, a decision is made as to whether a difference between the amounts of the relative characteristics meets a prescribed allowable error range or not. Then, the block 21 detects pairs of proximity characteristic points which meet the prescribed error range. If a number of the pairs of the proximity characteristic points which meet the prescribed allowable error range is greater than a threshold number which is determined by a total number of the proximity characteristic points, the block 21 detects a possibility that the characteristic point "a" is identical to the characteristic point "b". As the above threshold number, it is possible to use a number which is produced by multiplying a total number of proximity characteristic points of the characteristic point "a" by a prescribed value $\alpha$ (where $0<\alpha<1$). Further, it is possible to use a number which is produced by multiplying a total number of proximity characteristic points of the characteristic points "a" and "b" by a prescribed value $\alpha$.

If the block 21 makes a decision in steps A13 and A14 that there is a possibility that the characteristic point "a" is identical to the characteristic point "b", the block 21 proceeds to step A15 via step A14, wherein a pair of the characteristic points "a" and "b" are added to the matching characteristic point pair candidate list P. Thereafter, the block 21 repeats the step A12. If the block makes a decision that there is no possibility that the characteristic points are considered to be identical to each other, in other words, if a result of the decision of the step A14 is "NO", the block 21 repeats the step A12. The aforementioned steps are repeated until both of decision results of steps A16 and A17 turn to "YES". Namely, the aforementioned steps are repeated with respect to all of combinations of the characteristic points of the first and second figures.

When the matching characteristic point pair candidate creation block 21 creates the matching characteristic point pair candidate list P containing the matching characteristic point pair candidates, a decision result of the step A4 of the data processing device 2 turns to "YES". So, the matching characteristic point pair candidate list P is passed to the matching characteristic point pair candidate narrowing block 22. On the other hand, if the list P is not created, in other words, if the decision result of the step A4 is "NO", the data processing device outputs a message representing incapability of detection of figure location in step A5. This message is output to the output device 3.

The matching characteristic point pair candidate narrowing block 22 refers to the matching situation of the proximity characteristic points so as to detect a wrong matching characteristic point pair candidate which is considered as a wrong match. So, the block 22 removes the wrong matching characteristic point pair candidate from the matching characteristic point pair candidates listed in the matching characteristic point pair candidate list P, thus providing remained matching characteristic point pair candidates, which are registered in a matching characteristic point pair list Q as matching characteristic point pairs in step A6.

The detailed explanation of the step A6 is as follows:

At first, the device designates a matching characteristic point pair candidate which is registered in the matching characteristic point pair candidate list P. With regard to the designated matching characteristic point pair candidate, the device searches all of proximity characteristic points which exist in proximity to characteristic points of the first and second figures. Then, an amount of relative characteristics of the proximity characteristic point of the first figure is compared with an amount of relatively characteristics of the proximity characteristic point of the second figure. So, the device produces all of pairs of proximity characteristic points whose differences in amounts of relative characteristics meet a prescribed allowable error range. Incidentally, this prescribed allowable error range is identical to the allowable error range which is used by the matching characteristic point pair candidate creation block 21.

Thereafter, searching is performed on the matching characteristic point pair candidate list P, so an examination is performed as to whether the produced pairs of proximity characteristic points are registered in the matching characteristic point pair candidate list P. If a number of the pairs of the proximity characteristic points registered in the matching characteristic point pair candidate list P is greater than a prescribed rate of a total number of the produced pairs of the proximity characteristic points, the designated matching characteristic point pair candidate which the device designates is registered in the matching characteristic point pair list Q as a matching characteristic point pair. In short, if pairs of proximity characteristic points, differences of relative characteristics of which meet the allowable error range and which are used for making a decision as to whether a pair of characteristic points corresponding to the presently designated matching characteristic point pair candidate should be registered in the matching characteristic point pair candidate list P or not, are registered in the list P by more than a prescribed rate, the matching characteristic point pair candidate creation block 21 registers the presently designated matching characteristic point pair candidate in the matching characteristic point pair list Q as the matching characteristic point pair. The aforementioned processes are repeatedly performed with respect to all of matching characteristic point pair candidates which are registered in the matching characteristic point pair candidate list P.

In the flowchart of FIG. 2, the step A6 is executed only one time. However, if it is demanded to further narrow down the matching characteristic point pairs to correct ones, the matching characteristic point pair list Q is used as the matching characteristic point pair candidate list P so that the aforementioned processes are performed again by one or more times. Herein, the device detects proximity characteristic point pairs, whose differences in amounts of relatively characteristics meet the allowable error range, with respect to each of the matching characteristic point pairs registered in the matching characteristic point pair list Q. So, an examination is made as to whether a number of the above proximity characteristic point pairs occupy a prescribed rate or more of a total number of the pairs registered in the matching characteristic point pair list Q or not. Thus, the device lists matching characteristic point pairs each related to proximity characteristic point pairs, a number of which is greater than the prescribed rate of the total number of pairs registered in the list Q, so as to register them in another matching characteristic point pair list, which is denoted by Q1, for example.

In the data processing device 2, if the matching characteristic point pair candidate narrowing block 22 creates the matching characteristic point pair list Q containing the matching characteristic point pairs, in other words, if a decision result of the step A7 is "YES", the matching characteristic point pair list Q is passed to the figure position determination block 23. If the list Q is not created, in other words, if the decision result of the step A7 is "NO", the data processing device 2 outputs a message declaring the incapability of detection of figure location. The message is output to the output device 3 in step A5.

When receiving the matching characteristic point pair list Q, the figure location determination block 23 produces coordinate matching parameters to overlap the matching characteristic point pairs registered in the list Q in step A8. Then, the coordinate matching parameters are output to the output device 3 in step A9.

Detailed explanation of the step A8 is as follows:

At first, the device designates a matching characteristic point pair registered in the matching characteristic point pair list Q. Then, the device calculates an angle difference between two characteristic points included in the designated matching characteristic point pair as well as coordinate differences of X, Y coordinate values between the two characteristic points. The calculated differences are paired each other and recorded on a recording media. The above processes are repeatedly performed with respect to all of the matching characteristic point pairs registered in the matching characteristic point pair list Q. Among the recorded pairs of the differences, the device selects a pair of differences which calculation results concentrate in most frequently. So, the angle difference and coordinate differences of X, Y coordinate values of the most concentrated pair are used to form coordinate matching parameters. Incidentally, it is not necessarily use the most concentrated pair only for formation of the coordinate matching parameters. For example, a prescribed number of pairs, which count from the most concentrated pair, are selected, so that the angle differences and coordinate differences thereof are used for formation of coordinate matching parameters.

Next, the operation of the figure location detecting system of FIG. 1 will be explained more precisely in conjunction with an example where a search fingerprint is used for the first figure while a file fingerprint is used for the second figure.

In ridge line figures such as the fingerprints and palm prints, it is possible to use end points, at which ridge lines breaks off, and branch points, at which ridge lines branch off, as characteristic points. So, positions of the characteristic points as well as contact directions of the characteristic points which are placed in contact with the ridge lines can be used as amounts of characteristics. In addition, curvature as well as a number of ridge lines between characteristic points can be added to the amounts of characteristics.

In the case where the search fingerprint is used for the first figure while the file fingerprint is used for the second figure, the first figure characteristic point input block 11 inputs an amount of characteristics, which is produced with respect to each of characteristic points of the search fingerprint, to the data processing device 2 in step A1 of FIG. 2. In addition, the second figure characteristic point input block 12 inputs an amount of characteristics, which is produced with respect to each of characteristic points of the file fingerprint, to the data processing device 2 in step A2.

Thus, the matching characteristic point pair candidate creation block 21 operates in accordance with processes of the aforementioned flowchart of FIG. 3. That is, the block 21 designates a characteristic point from among the set R of the characteristic points of the search fingerprint, so that the designated characteristic point is denoted by the symbol "a" in step A11. In addition, the block 21 designates a characteristic point from among the set S of the characteristic points of the file fingerprint, so that the designated characteristic point is denoted by the symbol "b" in step A12. Then, the matching characteristic point pair candidate creation block 21 performs an examination as to a possibility that the characteristic points "a" and "b" are identical to each other in step A13. Herein, the examination is performed using amounts of relative characteristics which are produced with respect to proximity characteristic points of the characteristic points "a" and "b".

Figure 4:
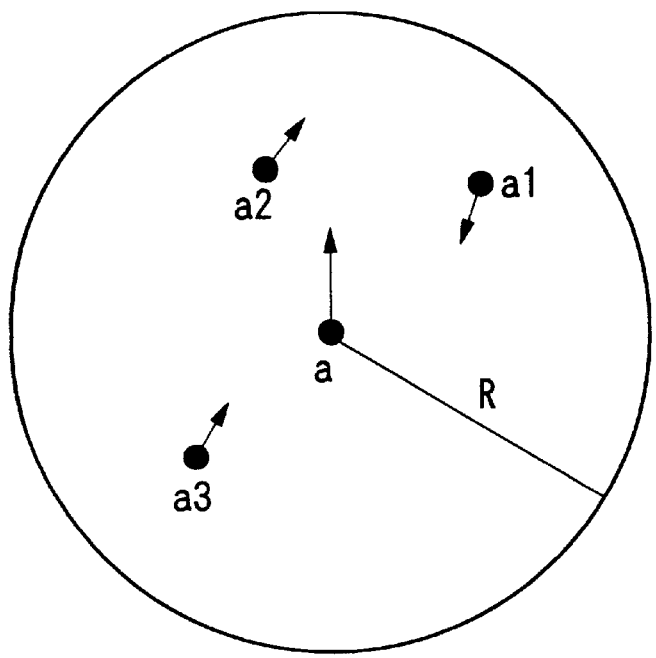
FIG. 4 shows an example of arrangement of proximity characteristic points which exist in proximity to a characteristic point of a search fingerprint.
Figure 5:
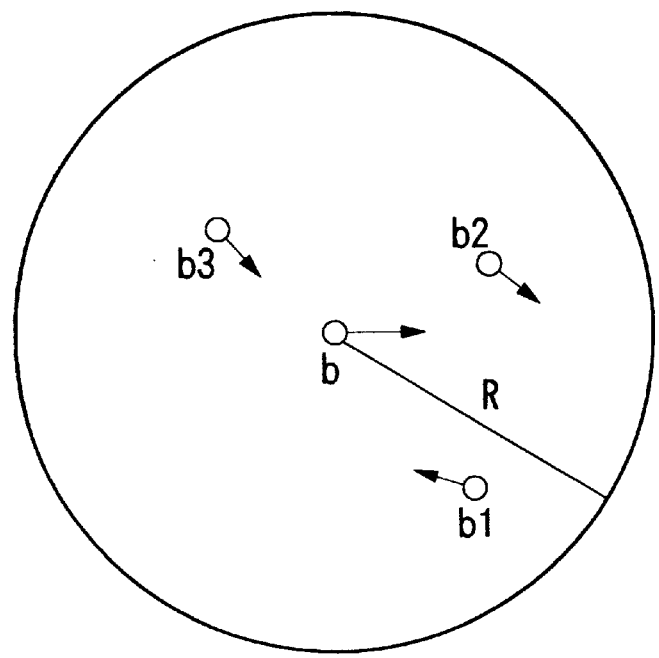
FIG. 5 shows an example of arrangement of proximity characteristic points which exist in proximity to a characteristic point of a file fingerprint.

Next, the process of the step A13 will be explained in detail. FIG. 4 shows an example where proximity characteristic points a1, a2, a3 exist in proximity to the characteristic point a. FIG. 5 shows an example where proximity characteristic points b1, b2, b3 exist in proximity to the characteristic point b. As shown in FIG. 4 and FIG. 5, proximity characteristic points are defined as characteristic points which exist in a circle of a radius R formed about the subject characteristic point.

In step A13, the matching characteristic point pair candidate creation block 21 firstly calculates an amount of relative characteristics with respect to each of the proximity characteristic points a1, a2, a3 which exist in proximity to the characteristic point a. Herein, an X-Y coordinate system is established such that the characteristic point a is used as an origin while a contact direction of the characteristic point a which is placed in contact with the ridge line is used as a Y axis. So, an amount of relative characteristics is produced using the coordinate values and contact direction with respect to each of the proximity characteristic points a1, a2, a3. Incidentally, it is possible to establish another X-Y coordinate system that a point having a prescribed relationship with the characteristic point a is used as an origin while a direction having a prescribed relationship with the contact direction of the characteristic point a placed in contact with the ridge line is used as an X axis or a Y axis. Using such an X-Y coordinate system, it is possible to produce an amount of relative characteristics using the coordinate values and contact direction with respect to each of the proximity characteristic points a1, a2, a3. In addition, a number of ridge lines, which exist between the characteristic point a and each of the proximity characteristic point a1, a2, a3, can be added to the amount of relative characteristics. Further, curvature of the ridge line measured at a position of the proximity characteristic point can be added to the amount of relative characteristics.

Next, the matching characteristic point pair candidate creation block 21 produces an amount of relative characteristics with respect to each of the proximity characteristic points b1, b2, b3 which exist in proximity to the characteristic point b.

Thereafter, the matching characteristic point pair candidate creation block 21 compares an amount of relative characteristics, produced for each of the proximity characteristic points a1, a2, a3, with an amount of relative characteristics produced for each of the proximity characteristic points b1, b2, b3. So, the block 21 searches a pair of the proximity characteristic points whose difference in the amount of relative characteristics meets a prescribed allowable error range. As a result, the block 21 sequentially finds out multiple pairs which meet the above. If a number of the pairs found out is greater than a threshold number which is determined based on a total number of the proximity characteristic points a1, a2, a3 which exist in proximity to the characteristic point a, t e block determines that there is a possibility that the characteristic point a is identical to the characteristic point b. If not, the block determines that there is no possibility.

Figure 6:
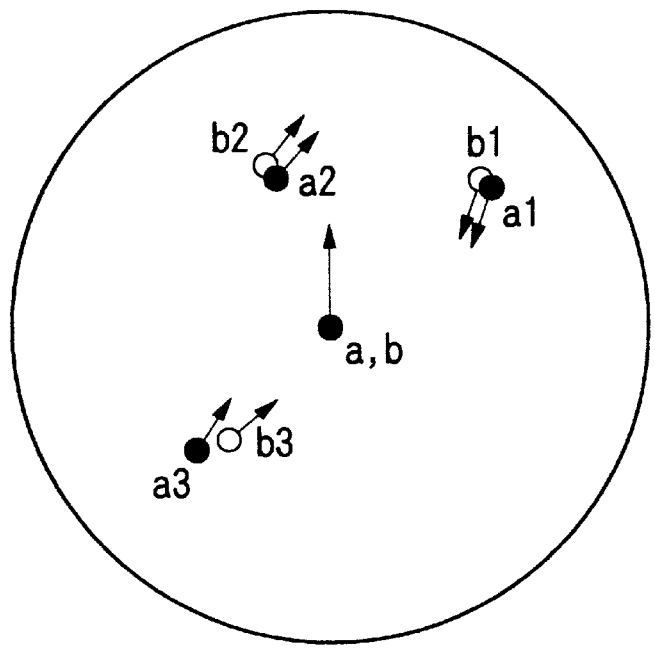
FIG. 6 shows relationships between amounts of relative characteristics of the proximity characteristic points shown in FIG. 4 and amounts of relative characteristics of the proximity characteristic points shown in FIG. 5.

Suppose the example of FIG. 4 that the proximity characteristic points a1, a2, a3 are arranged in proximity to the characteristic point a as well as the example of FIG. 5 that the proximity characteristic points b1, b2, b3 are arranged in proximity to the characteristic point b. FIG. 6 shows relationships between the amounts of relative characteristics of the proximity characteristic points a1, a2, a3 and the amounts of relative characteristics of the proximity characteristic points b1, b2, b3. In that case, all of differences between the amounts of relative characteristics of the proximity characteristic points a1, a2, a3 and the amounts of relative characteristics of the proximity characteristic points b1, b2, b3 meet the allowable error range which is prescribed in advance. So, the device makes a decision that there is a possibility that the characteristic point a matches with the characteristic point b.

Figure 7:
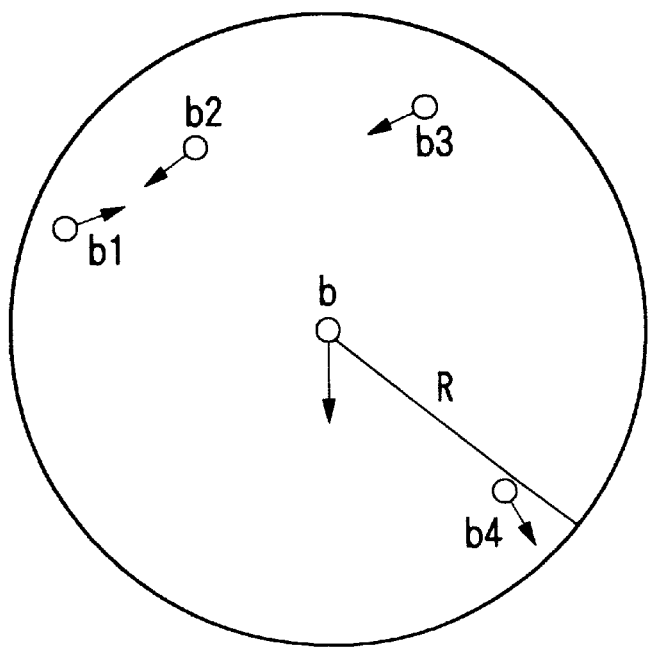
FIG. 7 shows another example of arrangement of proximity characteristic points which exist in proximity to a characteristic point of a file fingerprint.
Figure 8:
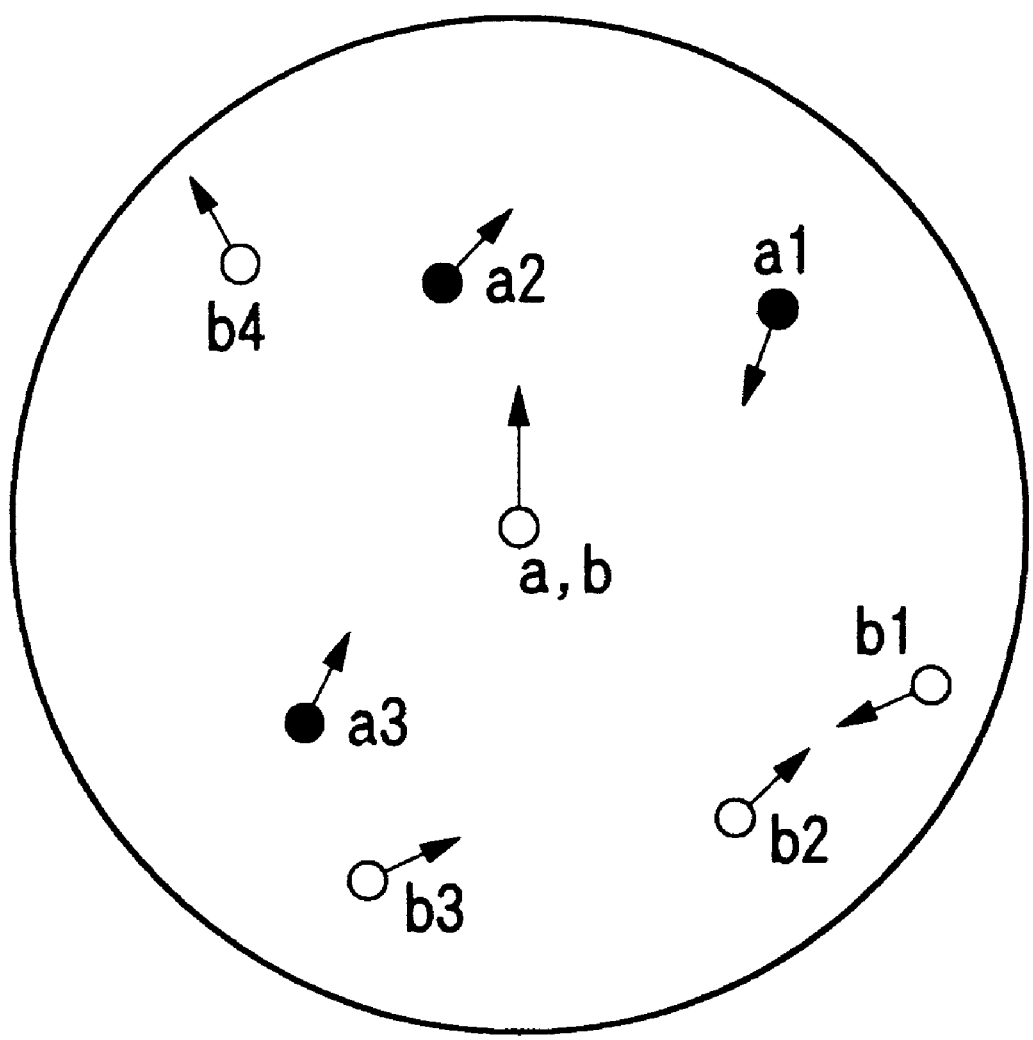
FIG. 8 shows relationship between amounts of relative characteristics of the proximity characteristic points shown in FIG. 4 and amounts of relative characteristics of the proximity characteristic points shown in FIG. 7.

Suppose another example of FIG. 7 that proximity characteristic points b1, b2, b3, b4 are arranged in proximity to the characteristic point b. Using FIG. 4 and FIG. 7, FIG. 8 shows relationships between the amounts of relative characteristics of the proximity characteristic points a1, a2, a3 and amounts of relative characteristics of the proximity characteristic points b1, b2, b3, b4. In the case of FIG. 8, there exists no pair of the proximity characteristic points whose difference in amount of relative characteristics meets the allowable error range. So, the device makes a decision that there is no possibility that the characteristic point a matches with the characteristic point b.

If the device makes a decision that there is a possibility that the characteristic point a is identical to the characteristic point b, in other words, if a decision result of step A14 is "YES", a pair of the characteristic points a, b are registered in the matching characteristic point pair candidate list P in step A15. Thereafter, the step A12 is performed again. If the device makes a decision that there is no possibility that the characteristic points are identical to each other, in other words, if the decision result of step A14 is "NO", the device repeats the step A12 immediately.

The matching characteristic point pair candidate creation block 21 repeats the aforementioned processes until both of decision results of steps A16, A17 turn to "YES".

If the matching characteristic point pair candidate creation block 21 creates the matching characteristic point pair candidate list P including the matching characteristic point pair candidates, in other words, if a decision result of step A4 is "YES", the data processing device 2 passes the list P to the matching characteristic point pair candidate narrowing block 22. If the block 21 does not create the list P, in other words, if the decision result of step A4 is "NO", the device 2 provides a message representing incapability of detection of figure location, which is output to the output device 3 in step A5.

As described before, the matching characteristic point pair candidate narrowing block 22 detects the wrong matching characteristic point pair candidate based on the matching state of the proximity characteristic points, so the block 22 removes it from the matching characteristic point pair candidates of the matching characteristic point pair candidate list P. Then, the block 22 registers remained pairs in the matching characteristic point list Q as matching characteristic point pairs in step A6.

If the matching characteristic point pair candidate narrowing block 22 creates the matching characteristic point pair list Q containing the matching characteristic point pairs, in other words, if a decision result of step A7 is "YES", the data processing device 2 passes the list Q to the figure location determination block 23. If the block 22 does not create the list Q, in other words, if the decision result of step A7 is "NO", the device 2 provides a message of incapability of detection of figure location, which is output to the output device 3 in step A5.

When receiving the matching characteristic point pair list Q, the figure location determination block 23 proceeds to step A8 to perform processes, as follows:

At first, the figure location determination block 23 designates a matching characteristic point pair registered in the matching characteristic point pair list Q. Now suppose an example that the block 23 extracts (or designates) a matching characteristic point pair consisting of a characteristic point "g" of a search fingerprint and a characteristic point "h" of a file fingerprint. In this example, the figure location determination block 23 produces coordinate matching parameters representing an amount of rotation and an amount of parallel displacement by which the characteristic point g is subjected to rotation and parallel displacement so that the characteristic point g is moved to match with the characteristic point h with respect to coordinates. Thereafter, the figure location determination block 23 extracts another matching characteristic point pair registered in the matching characteristic point pair list Q, so it performs processes similar to the above ones with respect to the extracted pair. After completion of the above processes with respect to all of the matching characteristic point pairs registered in the matching characteristic point pair list Q, the figure location determination block 23 totals the coordinate matching parameters. Herein, the block 23 selects the coordinate matching parameters whose frequency in occurrence is the highest. So, the block 23 determines the selected coordinate matching parameters to be output.

In step A9, the figure location determination block 23 outputs the coordinate matching parameters, which are determined by the step A8, to the output device 3.

Lastly, the effects of the invention can be summarized as follows:

Even if the first figure corresponding to the searched picture contain a plenty of similar characteristic points whose amounts of characteristics are similar to each other, or even if the first figure contain distortion, it is possible to produce "correct" coordinate matching parameters. Because, this invention is designed to make a decision, based on amounts of relative characteristics of proximity characteristic points, as to whether the characteristic points are chosen as the matching characteristic point pair candidates. In addition, this invention is designed to narrow down the matching characteristic point pairs on the basis of a result of a decision as to whether proximity characteristic point pairs, which are used for the decision whether to choose the characteristic points as the matching characteristic point pair candidates, are contained in the matching characteristic point pair candidates by more than a prescribed rate or not. That is, even if the first figure is distorted, this invention sets a narrow range corresponding to the proximity characteristic points so that the distortion can be neglected. Further, even if an amount of information regarding amounts of characteristics is small because of the setting of the narrow range of the proximity characteristic points, it is possible to narrow down the matching characteristic point pairs under a state of an increased amount of information because this invention is designed to narrow down the matching characteristic point pairs on the basis of a result of a decision as to whether the matching characteristic point pair candidates contain the proximity characteristic point pairs, used for the decision whether to choose the characteristic points as the matching characteristic point pair candidates, by more than a prescribed rate or not. So, even if the first figure contains a plenty of similar characteristic points, it is possible to reduce a risk that the narrowed matching characteristic point pairs, which are narrowed down, contain a wrong matching characteristic point pair which is considered as a wrong match.

In addition, it is possible to further reduce a risk that the "final" matching characteristic point pair candidates, which are finally obtained, contain a wrong matching characteristic point pair candidate which is considered as a wrong match because this invention is designed to narrow down the matching characteristic point pair candidates multiple times.

Further, even if the narrowed matching characteristic point pairs contain error, it is possible to produce "correct" coordinate matching parameters, because this invention is designed to output the most concentrated parameters within the coordinate matching parameters which are produced with respect to each of the matching characteristic point pairs. In other words, even if the narrowed matching characteristic point pairs contain a wrong matching characteristic point pair, the coordinate matching parameters calculated based on the wrong matching characteristic point pair must disperse in a variety of values while the coordinate matching parameters calculated based on the correct matching characteristic point pair converge on or around correct values. So, even if the matching characteristic point pairs contain error, it is possible to produce the correct coordinate matching parameters.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A figure location detecting method which detects a location of a first figure within a second figure in order to compare characteristic points of the first figure with characteristic points of the second figure, said figure location detecting method comprising the steps of:

sequentially designating one of the characteristic points of the first figure as a first characteristic point while sequentially designating one of the characteristic points of the second figure as a second characteristic point, so that pairs of the first and second characteristic points are sequentially provided;

calculating an amount of relative characteristics for each of proximity characteristic points which exist in proximity to the first characteristic point on the basis of a relationship between the first characteristic point and each of the proximity characteristic points, while calculating an amount of relative characteristics for each of proximity characteristic points which exist in proximity to the second characteristic point on the basis of a relationship between the second characteristic point and each of the proximity characteristic points;

making a decision as to whether the amount of relative characteristics calculated for each of the proximity characteristic points of the first characteristic point meets an allowable error range based on the amount of relative characteristics calculated for each of the proximity characteristic points of the second characteristic point;

sequentially detecting pairs of the first and second characteristic points each having the proximity characteristic points, amounts of relative characteristics of which meet the allowable error range and a number of which is greater than a threshold number, so that the detected pairs of the first and second characteristic points are used as matching characteristic point pair candidates;

narrowing down the matching characteristic point pair candidates to narrowed matching characteristic point pair candidates each consisting of the first and second characteristic points, wherein a number of pairs of proximity characteristic points, which exist in proximity to the first and second characteristic points respectively and differences of relative characteristics of which meet the allowable error range, is greater than a prescribed rate of a total number of the pairs of the proximity characteristic points included in the narrowed matching characteristic point pair candidate, so that the narrowed matching characteristic point pair candidates are used as matching characteristic point pairs;

sequentially producing coordinate matching parameters to match the characteristic points of the first figure with the characteristic points of the second figure with respect to each of the matching characteristic point pairs; and outputting most concentrated coordinate matching parameters which values of the coordinate matching parameters sequentially produced concentrate in most frequently.

2. A figure location detecting method as defined in claim 1 wherein the amount of relative characteristics contains coordinate values and a direction of the proximity characteristic point on a coordinate system, an origin of which is determined based on coordinate values of the characteristic point and an axis of which is determined based on an amount of characteristics of the characteristic point.

3. A figure location detecting method as defined in claim 1 further comprising the step of:

further narrowing down the narrowed matching characteristic point pairs to further narrowed matching characteristic point pairs each consisting of the first and second characteristic points, wherein a number of pairs of proximity characteristic points, which exist in proximity to the first and second characteristic points respectively and differences of relative characteristics of which meet the allowable error range, is greater than a prescribed rate of a total number of the pairs of the proximity characteristic points included in the further narrowed matching characteristic point pair candidate, so that the further narrowed matching characteristic point pair candidates are used as matching characteristic point pairs.

4. A figure location detecting method as defined in claim 1 wherein multiple sets of the coordinate matching parameters, which are counted from the most concentrated coordinate matching parameters, are output.

5. A figure location detecting device which detects a location of a first figure within a second figure in order to compare characteristic points of the first figure with characteristic points of the second figure, said figure location detecting device comprising:

designation means for sequentially designating one of the characteristic points of the first figure as a first characteristic point while sequentially designating one of the characteristic points of the second figure as a second characteristic point, so that pairs of the first and second characteristic points are sequentially provided;

calculation means for calculating an amount of relative characteristics for each of proximity characteristic points which exist in proximity to the first characteristic point on the basis of a relationship between the first characteristic point and each of the proximity characteristic points, while calculating an amount of relative characteristics for each of proximity characteristic points which exist in proximity to the second characteristic point on the basis of a relationship between the second characteristic point and each of the proximity characteristic points;

decision means for making a decision as to whether the amount of relative characteristics calculated for each of the proximity characteristic points of the first characteristic point meets an allowable error range based on the amount of relative characteristics calculated for each of the proximity characteristic points of the second characteristic point;

detection means for sequentially detecting pairs of the first and second characteristic points each having the proximity characteristic points, amounts of relative characteristics of which meet the allowable error range and a number of which is greater than a threshold number, so that the detected pairs of the first and second characteristic points are used as matching characteristic point pair candidates;

narrowing means for narrowing down the matching characteristic point pair candidates to narrowed matching characteristic point pair candidates each consisting of the first and second characteristic points, wherein a number of pairs of proximity characteristic points, which exist in proximity to the first and second characteristic points respectively and differences of relative characteristics of which meet the allowable error range, is greater than a prescribed rate of a total number of the pairs of the proximity characteristic points included in the narrowed matching characteristic point pair candidate, so that the narrowed matching characteristic point pair candidates are used as matching characteristic point pairs;

parameter producing means for sequentially producing coordinate matching parameters to match the characteristic points of the first figure with the characteristic points of the second figure with respect to each of the matching characteristic point pairs; and output means for outputting most concentrated coordinate matching parameters which values of the coordinate matching parameters sequentially produced concentrate in most frequently.

6. A figure location detecting device as defined in claim 5 wherein the amount of relative characteristics contains coordinate values and a direction of the proximity characteristic point on a coordinate system, an origin of which is determined based on coordinate values of the characteristic point and an axis of which is determined based on an amount of characteristics of the characteristic point.

7. A figure location detecting device as defined in claim 5 further comprising:

further narrowing means for further narrowing down the narrowed matching characteristic point pairs to further narrowed matching characteristic point pairs each consisting of the first and second characteristic points, wherein a number of pairs of proximity characteristic points, which exist in proximity to the first and second characteristic points respectively and differences of relative characteristics of which meet the allowable error range, is greater than a prescribed rate of a total number of the pairs of the proximity characteristic points included in the further narrowed matching characteristic point pair candidate, so that the further narrowed matching characteristic point pair candidates are used as matching characteristic point pairs.

8. A figure location detecting device as defined in claim 5 wherein the output means outputs multiple sets of the coordinate matching parameters, which are counted from the most concentrated coordinate matching parameters.

9. A machine-readable recording media storing programs which cause a computer to operate as a figure location detecting device which detects a location of a first figure within a second figure in order to compare characteristic points of the first figure with characteristic points of the second figure, said programs performing processes comprising the steps of:

sequentially designating one of the characteristic points of the first figure as a first characteristic point while sequentially designating one of the characteristic points of the second figure as a second characteristic point, so that pairs of the first and second characteristic points are sequentially provided;

calculating an amount of relative characteristics for each of proximity characteristic points which exist in proximity to the first characteristic point on the basis of a relationship between the first characteristic point and each of the proximity characteristic points, while calculating an amount of relative characteristics for each of proximity characteristic points which exist in proximity to the second characteristic point on the basis of a relationship between the second characteristic point and each of the proximity characteristic points;

making a decision as to whether the amount of relative characteristics calculated for each of the proximity characteristic points of the first characteristic point meets an allowable error range based on the amount of relative characteristics calculated for each of the proximity characteristic points of the second characteristic point;

sequentially detecting pairs of the first and second characteristic points each having the proximity characteristic points, amounts of relative characteristics of which meet the allowable error range and a number of which is greater than a threshold number, so that the detected pairs of the first and second characteristic points are used as matching characteristic point pair candidates;

narrowing down the matching characteristic point pair candidates to narrowed matching characteristic point pair candidates each consisting of the first and second characteristic points, wherein a number of pairs of proximity characteristic points, which exist in proximity to the first and second characteristic points respectively and differences of relative characteristics of which meet the allowable error range, is greater than a prescribed rate of a total number of the pairs of the proximity characteristic points included in the narrowed matching characteristic point pair candidate, so that the narrowed matching characteristic point pair candidates are used as matching characteristic point pairs;

sequentially producing coordinate matching parameters to match the characteristic points of the first figure with the characteristic point of the second figure with respect to each of the matching characteristic point pairs; and outputting most concentrated coordinate matching parameters which values of the coordinate matching parameters sequentially produced concentrate in most frequently.

10. A figure location detecting system comprising:

input means for inputting characteristic points of a first figure and for inputting characteristic points of a second figure;

candidate creating means for creating matching characteristic point pair candidates each corresponding to a pair of a first characteristic point, corresponding to one of the characteristic points of the first figure, and a second characteristic point corresponding to one of the characteristic points of the second figure on the basis of relative characteristics calculated for proximity characteristic points which exist in proximity to the first and second characteristic points respectively, candidate narrowing means for narrowing down the matching characteristic point pair candidates to matching characteristic point pairs each corresponding to a pair of the first and second characteristic points connected with proximity characteristic points whose differences in relative characteristics meet a prescribed allowable error range; and parameter producing means for producing coordinate matching parameters to match the characteristic points of the first figure with the characteristic points of the second figure with respect to each of the matching characteristic point pairs, wherein the candidate creating means further comprises decision means for making a decision as to whether an amount of relative characteristics calculated for each of proximity characteristic points of the first characteristic point meets an allowable error range based on an amount of relative characteristics calculated for each of proximity characteristic points of the second characteristic point; and detection means for sequentially detecting pairs of the first and second characteristic points each having the proximity characteristic points, amounts of relative characteristics of which meet the allowable error range and a number of which is greater than a threshold number, so that the detected pairs of the first and second characteristic points are used as the matching characteristic point pair candidates.

11. A figure location detecting system as comprising:

input means for inputting characteristic points of a first figure and for inputting characteristic points of a second figure;

candidate creating means for creating matching characteristic point pair candidates each corresponding to a pair of a first characteristic point corresponding to one of the characteristic points of the first figure, and a second characteristic point corresponding to one of the characteristic points of the second figure on the basis of relative characteristics calculated for proximity characteristic points which exist in proximity to the first and second characteristic points respectively;

candidate narrowing means for narrowing down the matching characteristic point pair candidates to matching characteristic point pairs each corresponding to a pair of the first and second characteristic points connected with proximity characteristic points whose differences in relative characteristics meet a prescribed allowable error range; and parameter producing means for producing coordinate matching parameters to match the characteristic points of the first figure with the characteristic points of the second figure with respect to each of the matching characteristic point pairs, wherein the candidate narrowing means narrows down the matching characteristic point pair candidates to narrowed matching characteristic point pair candidates each consisting of the first and second characteristic points, wherein a number of pairs of proximity characteristic points, which exist in proximity to the first and second characteristic points respectively and differences of relative characteristics of which meet the allowable error range, is greater than a prescribed rate of a total number of the pairs of the proximity characteristic points included in the narrowed matching characteristic point pair candidate, so that the narrowed matching characteristic point pair candidates are used as the matching characteristic point pairs.

12. A figure location detecting system as defined in claim 10 further comprising output means for outputting most concentrated coordinate matching parameters which values of the coordinate matching parameters sequentially produced concentrate in most frequently.

13. A figure location detecting system as defined in claim 10 further comprising output means for outputting multiple sets of the coordinate matching parameters, which are counted from most concentrated coordinate matching parameters which values of the coordinate matching parameters sequentially produced concentrate in most frequently.

14. A figure location detecting system as defined in claim 10 wherein the first figure corresponds to a search fingerprint while the second figure corresponds to a file fingerprint.

15. A machine-readable recording media storing a figure location detecting program which causes a machine to perform processes comprising the steps of:

creating matching characteristic point pair candidates each corresponding to a pair of a first characteristic point, corresponding to one of the characteristic points of the first figure, and a second characteristic point corresponding to one of the characteristic points of the second figure on the basis of relative characteristics calculated for proximity characteristic points which exist in proximity to the first and second characteristic points respectively;

narrowing down the matching characteristic point pair candidates to matching characteristic point pairs each corresponding to a pair of the first and second characteristic points connected with proximity characteristic points whose differences in relative characteristics meet a prescribed allowable error range; and producing coordinate matching parameters to match the characteristic points of the first figure with the characteristic points of the second figure with respect to each matching characteristic point pair, wherein the step of creating matching characteristic point pair candidates comprises:

making a decision as to whether an amount of relative characteristics calculated for each of proximity characteristic points of the first characteristic point of the first characteristic point meets an allowable error range based on an amount of relative characteristics calculated for each of proximity characteristic points of the second characteristic point; and sequentially detecting pairs of the first and second characteristic points each having the proximity characteristic points, amounts of relative characteristics of which meet the allowable error range and a number of which is greater than a threshold number, so that the detected pairs of the first and second characteristic points are used as the matching characteristic point pair candidates.

16. A figure location detecting system as defined in claim 10 wherein the candidate narrowing means narrows down the matching characteristic point pair candidates to narrowed matching characteristic point pair candidates each consisting of the first and second characteristic points, wherein a number of pairs of proximity characteristic points, which exist in proximity to the first and second characteristic points respectively and differences of relative characteristics of which meet the allowable error range, is greater than a prescribed rate of a total number of the pairs of the proximity characteristic points included in the narrowed matching characteristic point pair candidate, so that the narrowed matching characteristic point pair candidates are used as the matching characteristic point pairs.

17. A figure location detecting system as defined in claim 11 wherein the candidate creating means further comprises decision means for making a decision as to whether an amount of relative characteristics calculated for each of proximity characteristic points of the first characteristic point meets an allowable error range based on an amount of relative characteristics calculated for each of proximity characteristic points of the second characteristic point; and detection means for sequentially detecting pairs of the first and second characteristic points each having the proximity characteristic points, amounts of relative characteristics of which meet the allowable error range and a number of which is greater than a threshold number, so that the detected pairs of the first and second characteristic points are used as the matching characteristic point pair candidates.

18. A figure location detecting system as defined in claim 11 further comprising output means for outputting most concentrated coordinate matching parameters which values of the coordinate matching parameters sequentially produced concentrate in most frequently.

19. A figure location detecting system as defined in claim 11 further comprising output means for outputting multiple sets of the coordinate matching parameters, which are counted from most concentrated coordinate matching parameters which values of the coordinate matching parameters sequentially produced concentrate in most frequently.

20. A figure location detecting system as defined in claim 11 wherein the first figure corresponds to a search fingerprint while the second figure corresponds to a file fingerprint.

21. A machine-readable recording media storing a figure location detecting program which causes a machine to perform processes comprising the steps of:

creating matching characteristic point pair candidates each corresponding to a pair of a first characteristic point, corresponding to one of the characteristic points of the first figure, and a second characteristic point corresponding to one of the characteristic points of the second figure on the basis of relative characteristics calculated for proximity characteristic points which exist in proximity to the first and second characteristic points respectively;

narrowing down the matching characteristic point pair candidates to matching characteristic point pairs each corresponding to a pair of the first and second characteristic points connected with proximity characteristic points whose differences in relative characteristics meet a prescribed allowable error range; and producing coordinate matching parameters to match the characteristic points of the first figure with the characteristic points of the second figure with respect to each matching characteristic point pair, wherein the step of narrowing down the matching characteristic point pair candidates comprises narrowing down the matching characteristic point pair candidates to narrowed matching characteristic point pair candidates each consisting of the first and second characteristic points, wherein a number of pairs of proximity characteristic points, which exist in proximity to the first and second characteristic points respectively and differences of relative characteristics of which meet the allowable error range, is greater than a prescribed rate of a total number of the pairs of the proximity characteristic points included in the narrowed matching characteristic point pair candidate, so that the narrowed matching characteristic point pair candidates are used as the matching characteristic point pairs.

* * * * *